(12) United States Patent
Stamp (10) Patent No.: US 9,458,384 B2
(45) Date of Patent: Oct. 4, 2016

(54) CARBON NEUTRAL FUEL (71) Applicant: Rockfuel Innovations Limited, Colchester, Essex (GB)

(72) Inventor: Clive Roger Stamp, Suffolk (GB)

(73) Assignee: ROCKFUEL INNOVATIONS LIMITED (GB)

( * ) Notice: Subject to any disclaimer, the term of this patent is extended or adjusted under 35 U.S.C. 154(b) by 41 days.

(21) Appl. No.: 14/433,068

(22) PCT Filed: Oct. 4, 2013

(86) PCT No.: PCT/GB2013/052586
§ 371 (c)(1),
(2) Date: Apr. 2, 2015

(87) PCT Pub. No.: WO2014/053847
PCT Pub. Date: Apr. 10, 2014

(65) Prior Publication Data
US 2015/0275094 A1 Oct. 1, 2015

(30) Foreign Application Priority Data
Oct. 4, 2012 (GB) .................................. 1217741.6

(51) Int. Cl.
*C10B 57/04* (2006.01)
*F01K 7/16* (2006.01)
(Continued)

(52) U.S. Cl.
CPC .............. *C10B 57/04* (2013.01); *B01J 19/245* (2013.01); *B01J 19/2445* (2013.01); *C01B 31/18* (2013.01); *C01B 31/20* (2013.01); *C04B 2/10* (2013.01);
(Continued)

(58) Field of Classification Search
CPC .......... C01B 31/18; C01B 31/20; C10J 3/00; C10J 3/005; C10J 2300/0943; C10J 2300/0969; C10J 2300/1662; C10J 2300/1675; C10J 2300/0996; C10K 3/04; C10L 3/08; C10B 57/04; B01J 19/245; B01J 19/2445; F01K 7/16; C04B 2/10
USPC ................... 60/645, 670; 422/162, 623, 639, 422/209–223; 423/418.2; 518/704
See application file for complete search history.

(56) References Cited

U.S. PATENT DOCUMENTS 2,128,262 A 8/1938 Newman
2,778,716 A * 1/1957 Bagley .................... C01B 31/32
373/63

(Continued)

FOREIGN PATENT DOCUMENTS

CN 1049177 7/1989
GB 10624 0/1903

(Continued)

*Primary Examiner* — Daniel C McCracken
(74) *Attorney, Agent, or Firm* — Renner Kenner Greive Bobak Taylor & Weber (57) ABSTRACT

A system (10) for producing carbon monoxide as a step in a process for the production of carbon neutral fuel includes heating apparatus (11) arranged to heat coal to produce coke and a limekiln (32). The limekiln (32) has an inlet (34) for the introduction of limestone, a heater (35) for heating limestone contained therein and an outlet (36) for the release of carbon dioxide. A coke chamber (39) is operatively connected to the heating apparatus (11) to receive coke therefrom and is operatively connected to the limekiln outlet (36) to receive carbon dioxide therefrom. The coke chamber (39) is configured to react received coke with received carbon dioxide, thereby to produce carbon monoxide.

17 Claims, 4 Drawing Sheets

(51) Int. Cl.
  *B01J 19/24* (2006.01)
  *C01B 31/18* (2006.01)
  *C10K 3/04* (2006.01)
  *C10L 3/08* (2006.01)
  *C04B 2/10* (2006.01)
  *C10J 3/00* (2006.01)
  *C01B 31/20* (2006.01)

(52) U.S. Cl.
  CPC  *C10J 3/00* (2013.01); *C10J 3/005* (2013.01); *C10K 3/04* (2013.01); *C10L 3/08* (2013.01); *F01K 7/16* (2013.01); *B01J 2219/00074* (2013.01); *B01J 2219/24* (2013.01); *C01B 2203/0283* (2013.01); *C01B 2203/0445* (2013.01); *C01B 2203/06* (2013.01); *C10J 2300/0943* (2013.01); *C10J 2300/0969* (2013.01); *C10J 2300/0996* (2013.01); *C10J 2300/1618* (2013.01); *C10J 2300/1662* (2013.01); *C10J 2300/1675* (2013.01); *C10L 2290/06* (2013.01); *C10L 2290/42* (2013.01)

(56) References Cited

U.S. PATENT DOCUMENTS

| | | | | |
|---|---|---|---|---|
| 3,188,171 | A | * | 6/1965 | Ghyssaert ............ C01C 3/20 |
| | | | | 422/209 |
| 4,040,976 | A | | 8/1977 | Greene |
| 4,604,165 | A | | 8/1986 | Calderon |
| 2006/0169181 | A1 | | 8/2006 | Youn |
| 2006/0236702 | A1 | | 10/2006 | Firey |

FOREIGN PATENT DOCUMENTS

| | | |
|---|---|---|
| GB | 14971 | 0/1908 |
| GB | 233137 | 5/1924 |
| GB | 727497 | 8/1952 |
| WO | 2009079681 | 7/2009 |
| WO | 2010002469 | 7/2010 |

\* cited by examiner

CARBON NEUTRAL FUEL

This invention relates to a system for the production of carbon monoxide as a step in the process for the production of carbon neutral fuel. The invention also relates to a method for producing carbon monoxide as a step in the process for the production of carbon neutral fuel.

The term "system" is used herein to mean an arrangement of apparatus and while some of the component parts of the apparatus are entirely conventional and/or known per se the particular assemblage is novel and wholly inventive. Further, the phrase "carbon neutral" is used herein to mean that the amount of carbon dioxide produced during the process is balanced or offset by the subsequent absorption or capture of an equivalent quantity of carbon dioxide.

The combustion of fossil fuels creates large quantities of greenhouse gases and harmful emissions. The combustion of coal in particular creates an enormous amount of carbon dioxide each year. Throughout the world coal is used as the main energy source for the generation of electricity. With increasing concerns of climate change due to greenhouse gases, there is a need to reduce the amount of air pollution caused by the combustion of coal and by industrial manufacturing processes.

In an attempt to reduce pollution caused by the burning of coal, there is an increasing need for a clean coal technology for the production of carbon neutral fuel. Processes for producing fuels using compounds and elements, such as carbon dioxide and hydrogen are well established. Almost inevitably, such methods are not carbon neutral since obtaining carbon dioxide directly from the atmosphere is not only expensive but is also problematic in that the extraction process can create yet even more pollution.

It is a principal aim of the present invention to address the environmental damage caused by the combustion of coal and to provide apparatus and a method for producing carbon dioxide from limestone, which apparatus and method can be used as part of a process for producing carbon neutral fuel. The invention aims to reduce the release of harmful emissions to the atmosphere by the burning of coal, so as to have a smaller impact on the environment and climate change.

According to a first aspect of this invention, there is provided a system for producing carbon monoxide as a step in a process for the production of carbon neutral fuel, the system comprising:
  heating apparatus arranged to heat coal to produce coke;
  a limekiln comprising: an outer vessel for containing limestone, an inlet for the introduction of limestone into the outer vessel, an inner chamber disposed substantially co-axially within the outer vessel, a heater arranged within the inner chamber for heating limestone contained within the outer vessel, and an outlet for the release of carbon dioxide;
  a coke chamber operatively connected to the heating apparatus to receive coke therefrom and operatively connected to the limekiln outlet to receive carbon dioxide therefrom;
wherein the coke chamber is configured to react received coke with received carbon dioxide, thereby to produce carbon monoxide.

According to a second but closely related aspect of this invention, there is provided a method of producing carbon monoxide as a step in a process for the production of carbon neutral fuel comprising:
  heating coal to produce coke;
  heating limestone in an outer vessel of a limekiln, the limekiln having an inlet for the introduction of limestone into the outer vessel, an inner chamber disposed substantially co-axially within the outer vessel, a heater arranged within the inner chamber for heating said limestone within the outer vessel and an outlet for the release of carbon dioxide yielded by the heated limestone; and
  combining in a coke chamber coke from the heating apparatus with carbon dioxide from the outlet of the limekiln to produce carbon monoxide.

The term "coal" is intended to mean a combustible black or dark brown rock consisting chiefly of carbonised plant matter found mainly in underground seams and used as fuel, and this includes (but is not limited to) brown coal, lignite and anthracite. Heating coal to produce coke inevitably results in the production of further gases in addition to coke. Such gases include methane and hydrogen. The carbon monoxide produced by the coke chamber, when combined with these additional gases using known methods, forms a gaseous fuel (commonly referred to as town gas). When this gaseous fuel is combusted, carbon dioxide will be released into the atmosphere. Calcination of limestone by heating releases carbon dioxide and produces quicklime. The released carbon dioxide is transferred to the coke chamber to react with coke in order to produce carbon monoxide. The quicklime released from the kiln will absorb carbon dioxide from the atmosphere. Thus, the system and process of the present invention may be used to produce a carbon neutral fuel.

In a preferred arrangement of the present invention the system further comprises a water gas shift reactor operatively connected to the coke chamber to receive carbon monoxide therefrom and having an inlet for the introduction of water, and wherein the water gas shift reactor is configured to react received carbon monoxide with introduced water, thereby to produce hydrogen. This arrangement requires the further method steps of passing the carbon monoxide to a water gas shift reactor, supplying water to the reactor and reacting that water with carbon monoxide using the water gas shift reaction to produce hydrogen.

The term "water" as used herein means water in its liquid, gaseous or vaporous phases. The water gas shift reaction is the phrase used to describe the chemical reaction which occurs when carbon monoxide reacts with water vapour. This is a known reaction which produces hydrogen and carbon dioxide. The resultant hydrogen may be used as a carbon neutral fuel. The resultant carbon dioxide may be sequestrated or used for other "carbon neutral" purposes, as discussed in more detail below.

In a preferred arrangement the heating apparatus includes a boiler for converting water to steam, the boiler having an inlet for the introduction of water and an outlet for steam. In this way, the heater of the limekiln may be in communication with the boiler outlet so that steam from the boiler is supplied directly to the heater to facilitate the heating of limestone within the limekiln. This arrangement is particularly advantageous where the heating apparatus operates to produce steam having temperatures in the region of 900° C. to 1000° C., which is most efficient for the heating apparatus to produce coke. Such high temperatures may advantageously assist in the scrubbing of particulates, such as sulphur and mercury from the system.

In an alternative arrangement, the heater of the limekiln may be an electrical resistance heating element and the system may include a steam turbine and generator in communication with the boiler outlet and arranged to power the heater of the limekiln so that steam from the boiler is supplied directly to the turbine to drive the electricity generator. If the steam produced by the boiler is less than 900° C., this arrangement is particularly advantageous as it allows the limekiln to be supplied with sufficient heat for the calcination of limestone. In this arrangement, all of the steam produced by the boiler may be directed to the turbine for the production of electricity to power the heater.

Both of the above discussed arrangements may be used together such that the heater of the limekiln is capable of receiving steam directly from the boiler and also comprises an electrical heating element to provide additional heat within the limekiln. In such an arrangement if the steam produced by the boiler is less than 900° C., a portion of the steam produced by the boiler may be supplied directly to the heater to facilitate the heating of limestone within the limekiln with the remainder of the steam being directed to the turbine for the production of electricity to power the electrical heating element further to heat the limestone within the limekiln.

The heating of limestone in conventional kilns is carried out by burning fossil fuels, which is environmentally unacceptable. The apparatus of this invention addresses this problem by using the heat generated by boiler steam to heat the limestone in a rotary kiln. The heat required by the kiln in order most efficiently to release carbon dioxide from limestone is in the region of 900° C. to 950° C., though of course, carbon dioxide can be released at lower temperatures.

Where the system of the present invention includes a boiler, the steam output from the boiler may primarily be used to generate electricity. In this case, the system may comprise a turbine-driven generator set connected to the boiler and means to direct most (if not all) of the steam from the boiler to the turbine of the generator set for the production of electricity for supply to an electricity distribution system and/or to the heater (where an electrical resistance heating element is provided). To recover water from the spent steam leaving the turbine, a steam condenser may be provided in communication with the turbine-driven generator set for the supply of condensed water to the inlet of the water gas shift reactor. In this way, the water may be reused.

In a preferred arrangement of the present invention, the system also includes a Sabatier reaction chamber which is operably connected to the water gas shift reactor to receive carbon dioxide and hydrogen therefrom. The reaction chamber is configured to react the carbon dioxide and hydrogen using the Sabatier reaction to produce methane. In this way, carbon dioxide and hydrogen from the water gas shift reactor may be used to produce methane as a carbon neutral fuel. Methane produced using this method may be processed using known conventional methods to produce other types of fuel, such as methanol, butane or butanol, the latter being a direct substitute for fuel in an internal combustion engine. The heat and pressure in the system may be utilised to process methane in order to produce methanol, butane or butanol.

The quicklime produced by the heating of limestone in the limekiln could be used in vehicle exhaust filters or along motorways or other areas of high carbon dioxide pollution in order to absorb the carbon dioxide. Additionally or alternatively, the quicklime could be made into mortar-like slabs which could be utilised in sea defences, new quays and the like. Quicklime is particularly good at absorbing carbon dioxide when placed in water and this could be especially beneficial in coastal projects.

In the present invention, the heating apparatus is used to heat coal to produce coke. Advantageously, the heating apparatus may include a gasifier and the coal heated by gasification in an oxygen starved environment. Alternatively, the coal may be subjected to pyrolysis or destructive distillation or simply heated in an oxygen starved environment. Various other gases produced during the heating of coal can be utilised in the method of the invention. In particular, residual excess carbon dioxide may be passed from the heating apparatus to the coke chamber; carbon monoxide may be passed from the heating apparatus to the water gas shift reactor (if provided); hydrogen may be passed to the Sabatier reactor (if provided); and methane may be used as a fuel or processed further to produce methanol, butane or butanol as discussed previously.

Preferably, the limekiln is a rotary kiln comprising an outer generally cylindrical vessel for containing the limestone, that vessel being mounted for rotation about a generally horizontal axis, or an axis inclined at a small angle to the horizontal. The heater may be arranged within an inner chamber disposed substantially co-axially within the vessel. In use, the outer rotary vessel rotates about the stationary inner chamber, mixing and tumbling the limestone over the hot inner chamber to cause calcination of that limestone.

The production of carbon dioxide from limestone is preferably carried out as a batch-type process rather than a continuous process. This allows calcinated limestone (in the form of quicklime) to be discharged from the kiln and a fresh charge of limestone to be added to the kiln, while the rotary vessel is held stationary. Suitable valve arrangements should be provided for openings into the rotary kiln, to allow the removal of quicklime and the introduction of limestone.

In some cases a marginal excess of carbon dioxide may be produced by the system. If this occurs, to ensure that that the system is carbon neutral, it may be necessary to subject such excess carbon dioxide to electrolysis in order to form solid carbon and oxygen or sequestrate an equivalent amount to the marginal excess carbon dioxide from the process which can easily be collected from the limekiln exhaust. The electrolysis process may be powered by electricity produced by the system. Similarly, it may be possible that excess trace methane is produced by the system and if this occurs, high temperatures generated by the system and method may be utilised in a "steam reformation" manner to react the methane into hydrogen and carbon monoxide. Thus, the system and method of the present invention may be used to produce a fully carbon neutral fuel.

By way of example only, the system of this invention will now be described in detail, reference being made to the accompanying drawings in which.

Figure 1:
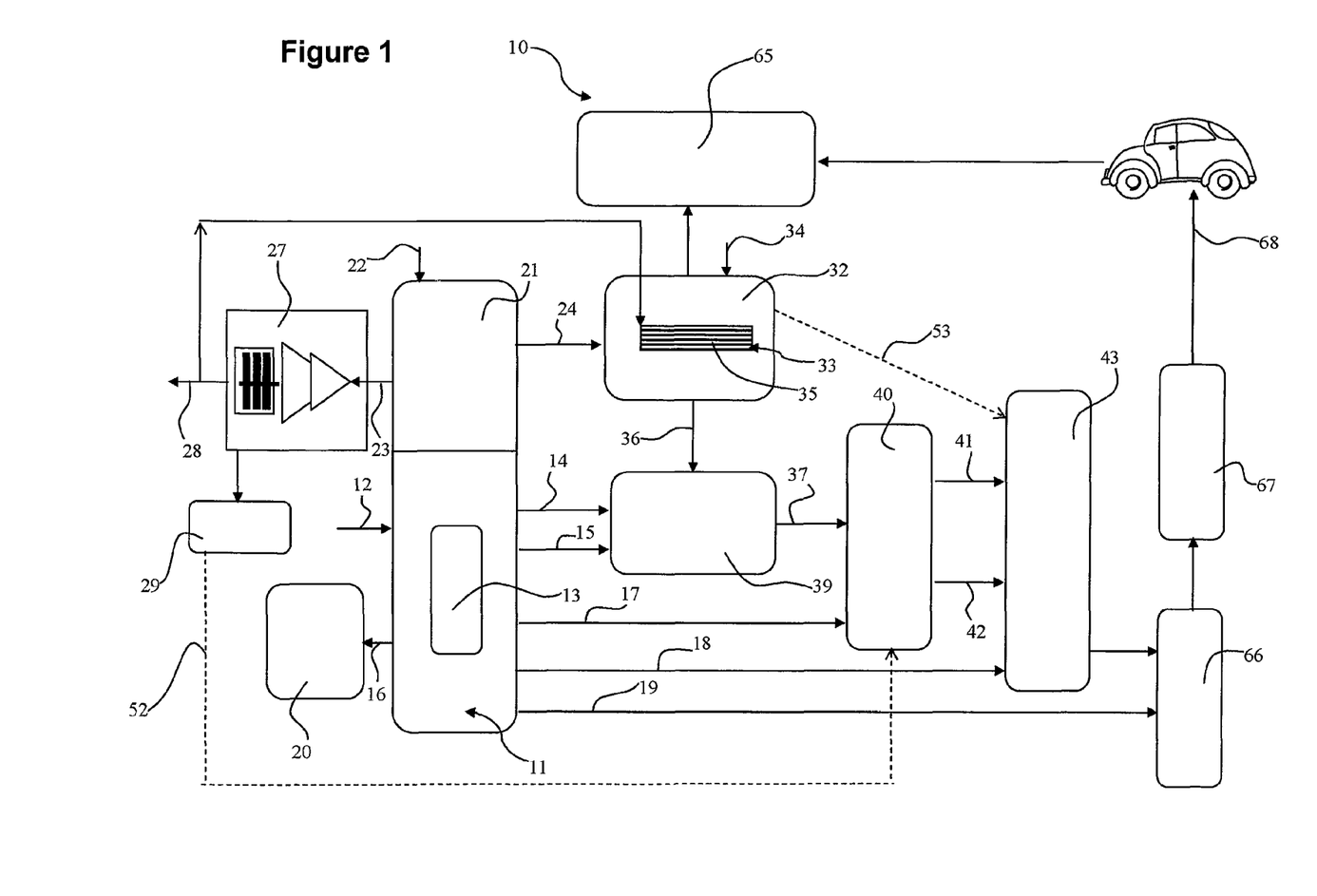
FIG. 1 is a simplified diagram of the system for producing carbon neutral fuel which operates in accordance with the method of this invention.

Referring initially to FIG. 1, there is shown a system 10 for the production of carbon neutral fuel comprising heating apparatus 11 having an inlet 12 for the introduction of coal, a gasifier 13 for heating the coal and a plurality of outlets 14, 15, 16, 17, 18, 19 for the resultant gases. Separation means (not shown) are provided to isolate the separate gases following gasification and to direct these to the correct outlet. Such means are known in the art and are not discussed further here.

A scrubber 20 is connected to the heating apparatus 11 to collect noxious particulates and other non-desired gases. The heating apparatus 11 includes a boiler 21 having a water inlet 22 and two steam outlets 23, 24. The boiler 21 receives heat from the heating apparatus 11 to convert water into steam.

A turbine-driven generator set 27 is arranged to receive a portion of the steam from one of the boiler outlets 23 and is configured to generate electricity for supply to an electricity distribution centre 28. A condenser 29 is connected to the turbine steam outlet of the turbine-driven generator set 27 to condense the steam into water for other uses.

A limekiln 32 is provided for the production of carbon dioxide from limestone. The limekiln 32 is in communication with the other of the boiler steam outlets 24 to provide heat to the inner chamber 33 of the limekiln for the heating of the limestone. The limekiln 32 is provided with an inlet 34 for the introduction of limestone, a heater 35 for heating the limestone and an outlet 36 for the release of carbon dioxide.

A coke chamber 39 is operatively connected to both the heating apparatus 11 and the limekiln outlet 36. Valves and control means (neither shown) are provided to control the passing of carbon dioxide and coke from the heating apparatus 11 and carbon dioxide from the limekiln outlet 36 to the coke chamber 39. The coke chamber 39 is operatively connected to a water gas shift reactor 40 and similarly is provided with valve and control means (not shown) to direct carbon monoxide from the coke chamber 39 to the water gas shift reactor 40.

The water gas shift reactor 40 is supplied with condensed water from the condenser 29 of the turbine-generator set 27 to facilitate the water gas shift reaction. One of the heating apparatus outlets 17 is connected to the reactor 40 for the supply of carbon monoxide directly to the reactor 40 from the heating apparatus 11. The water gas shift reactor 40 is operatively connected by way of conduits 41, 42 to a Sabatier reactor 43 which is arranged to receive carbon dioxide and hydrogen from the water gas shift reactor 40. One of the heating apparatus outlet pipes 18 is connected to the Sabatier reactor 43 for receiving hydrogen directly from the heating apparatus 11. The Sabatier reactor 43 is in communication with the limekiln 32 to receive residuary heat from the limekiln 32 to assist in the Sabatier reaction process.

Figure 2:
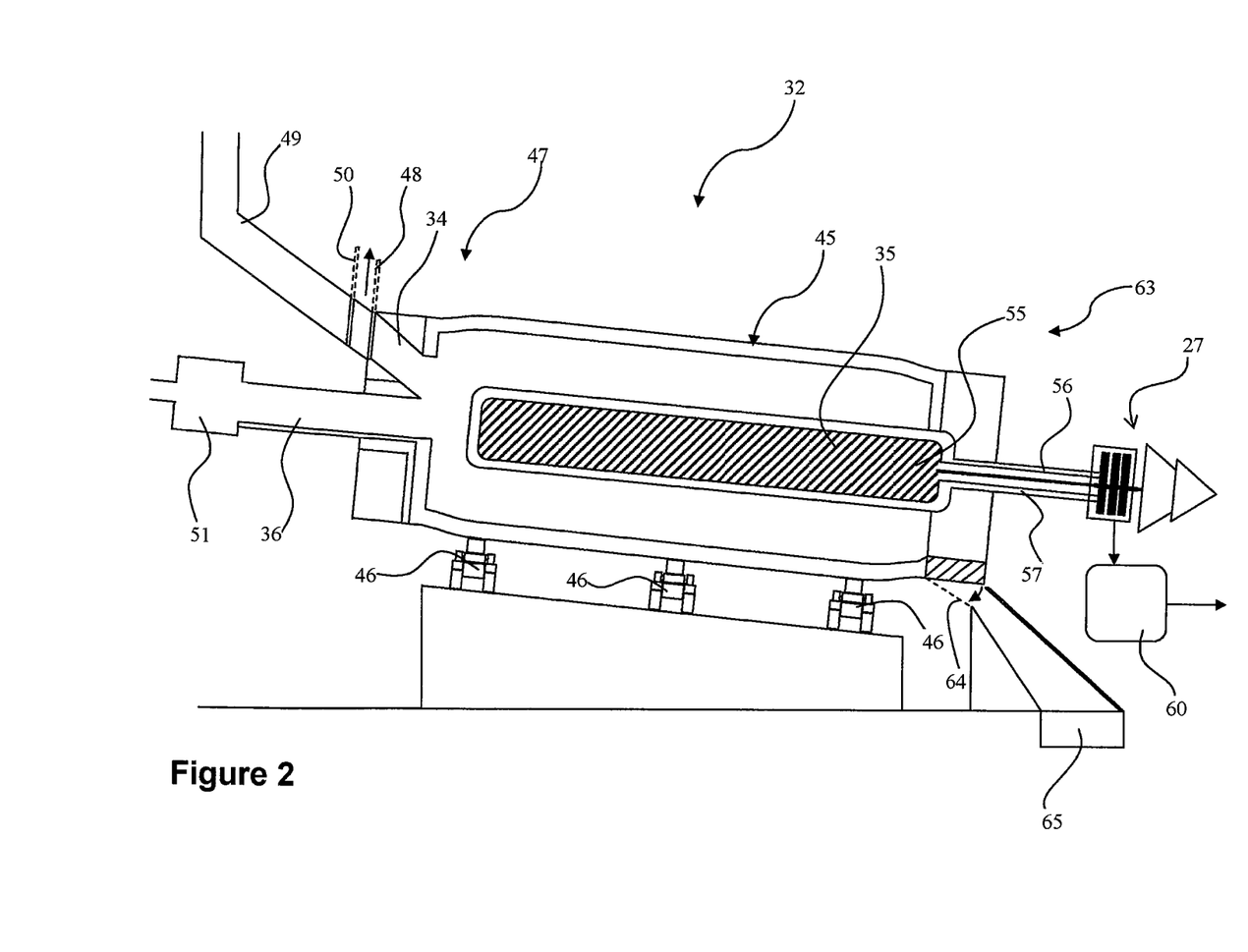
FIG. 2 is a diagrammatic axial section through one embodiment of rotary kiln for the production of carbon dioxide from limestone.
Figure 3:
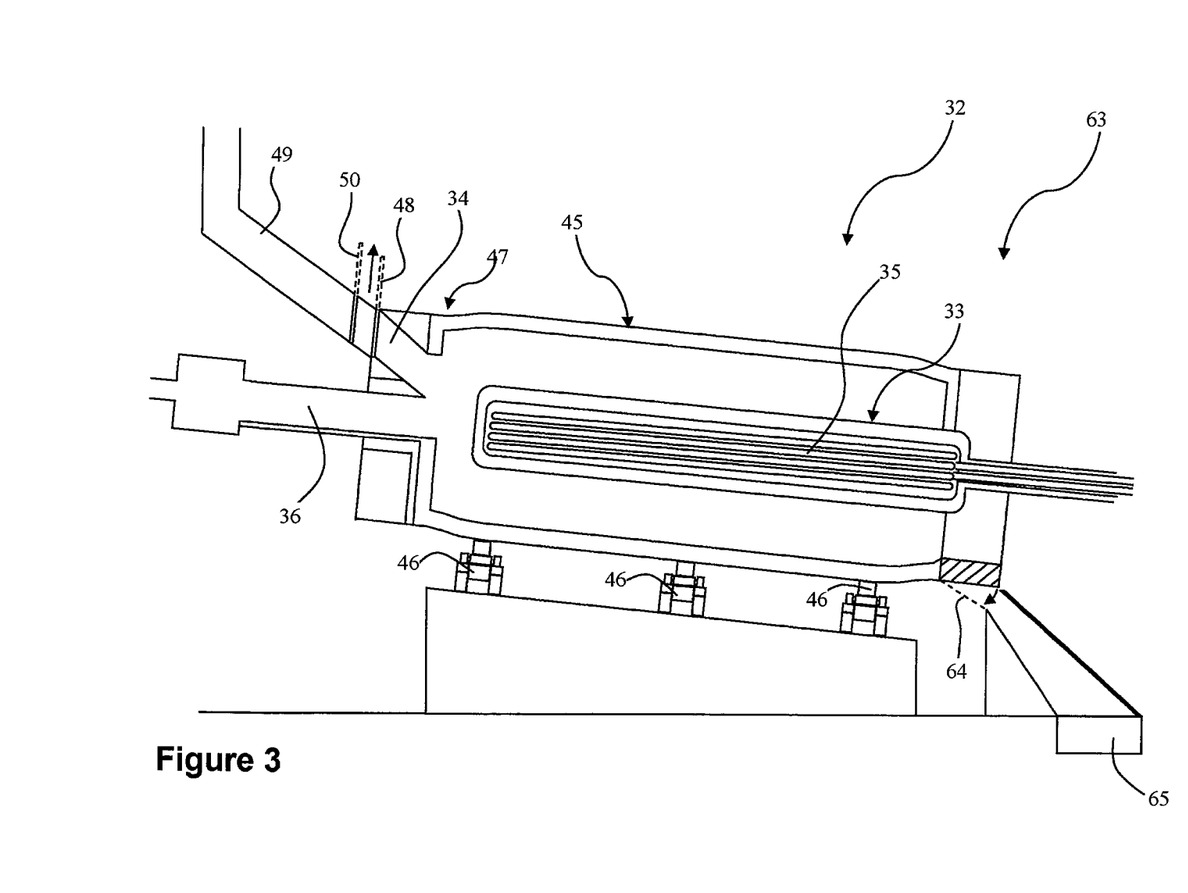
FIG. 3 is a diagrammatic axial section through an alternative embodiment of rotary kiln for the production of carbon dioxide from limestone and FIG. 4 is a diagrammatic axial view through the heating apparatus of FIG. 1.

Referring now to FIGS. 2 and 3, the limekiln 32 comprises a generally cylindrical vessel 45 having an inner chamber 33 mounted coaxially therein. The vessel 45 is supported on three pairs of horizontally-spaced rollers 46 with the vessel axis inclined at a small angle to the horizontal. At least one roller 46 of each pair includes a motor (not shown) to effect rotation of the vessel 45. The inlet 34 for the introduction of limestone is provided at the raised end 47 of the limekiln 32, that inlet 34 being provided with a gate valve 48. A stationary inlet duct 49 also provided with a gate valve 50 is arranged so that on rotation of the vessel 45, the inlet 34 will come into register with the duct 49 when the inlet 34 is uppermost. When in register and both gate valves 48, 50 are opened, limestone may pass from the duct 49 to the inlet 34 and so into the vessel 45.

The outlet pipe 36 is provided at the raised end 47 of the kiln for carbon dioxide generated within the vessel 45. A gas-type rotary joint (not shown) is arranged between the vessel 45 and the pipe 36 and a valve (also not shown) is disposed within the pipe 36 to control the release of carbon dioxide. The pipe 36 feeds the carbon dioxide to a scrubber 51 to clean the carbon dioxide and discharge unwanted effluents to waste.

The inner chamber 33 of the limekiln is formed from stainless steel reinforced as necessary to withstand the tumbling of the limestone within the vessel 45.

In the embodiment shown in FIG. 2, the heater 35 is a resistive heating element 55 disposed within the chamber 33 and electricity supply cables 56, 57 are connected to that element 55 and are provided with electrical, thermal and mechanical insulation to allow the supply of electricity to the element through an external control unit (not shown). In turn, the turbine and generator set 27 is arranged to receive steam from the boiler outlet 23 and is connected to the control unit so that the heater 35 may be powered from the set 27, to raise the temperature within the limekiln 32 sufficiently to cause calcination of the limestone. A condenser 29 is connected to the turbine steam outlet of the turbine generator set 27 to condense the steam into water. This water may then be supplied to the water gas shift reactor 40 to facilitate the reaction.

In the embodiment of FIG. 3, there is no turbine and generator set as steam from the outlet 24 of the boiler 21 is passed directly to the inner chamber 33 to provide heat to the limekiln 32. This arrangement is preferred where the steam from the boiler 21 is of sufficient temperature most efficiently to heat limestone within the limekiln 32. Ideally, this arrangement is used where the temperature of the steam is in the region of 900° C. to 1000° C. If the steam is lower than 900° C., the arrangement of FIG. 2 may be utilised so as to generate the temperatures necessary for calcination of limestone within the limekiln 32.

In both embodiments, an automatically-operating one-way gate at the steam entrance of the rotary kiln (not shown) serves to prevent steam exiting the limekiln 32 through the inlet, in the event of a blowback.

FIG. 1 shows a further embodiment which combines the heater arrangements of the embodiments of both FIGS. 2 and 3. In this way, the heater 35 comprises a resistive heating element 55 connected to an electricity supply cable 38 and additionally steam from the outlet 24 of the boiler 21 is passed directly to the inner chamber 33 to provide heat to the limekiln 32. Such an arrangement may be used to ensure that sufficient heat may be supplied to the limekiln for the heating of limestone therein.

At the lower end 63 of the vessel, there is provided a door 64 which, when the inlet 34 is in register with the inlet duct 49, comes into register with an outlet duct 65, to enable the removal of quicklime produced by the calcination of limestone within the kiln. Residual heat 53 which has been drawn from the limekiln may be transferred to the Sabatier reactor 43 to provide additional heat for the Sabatier reaction.

Figure 4:
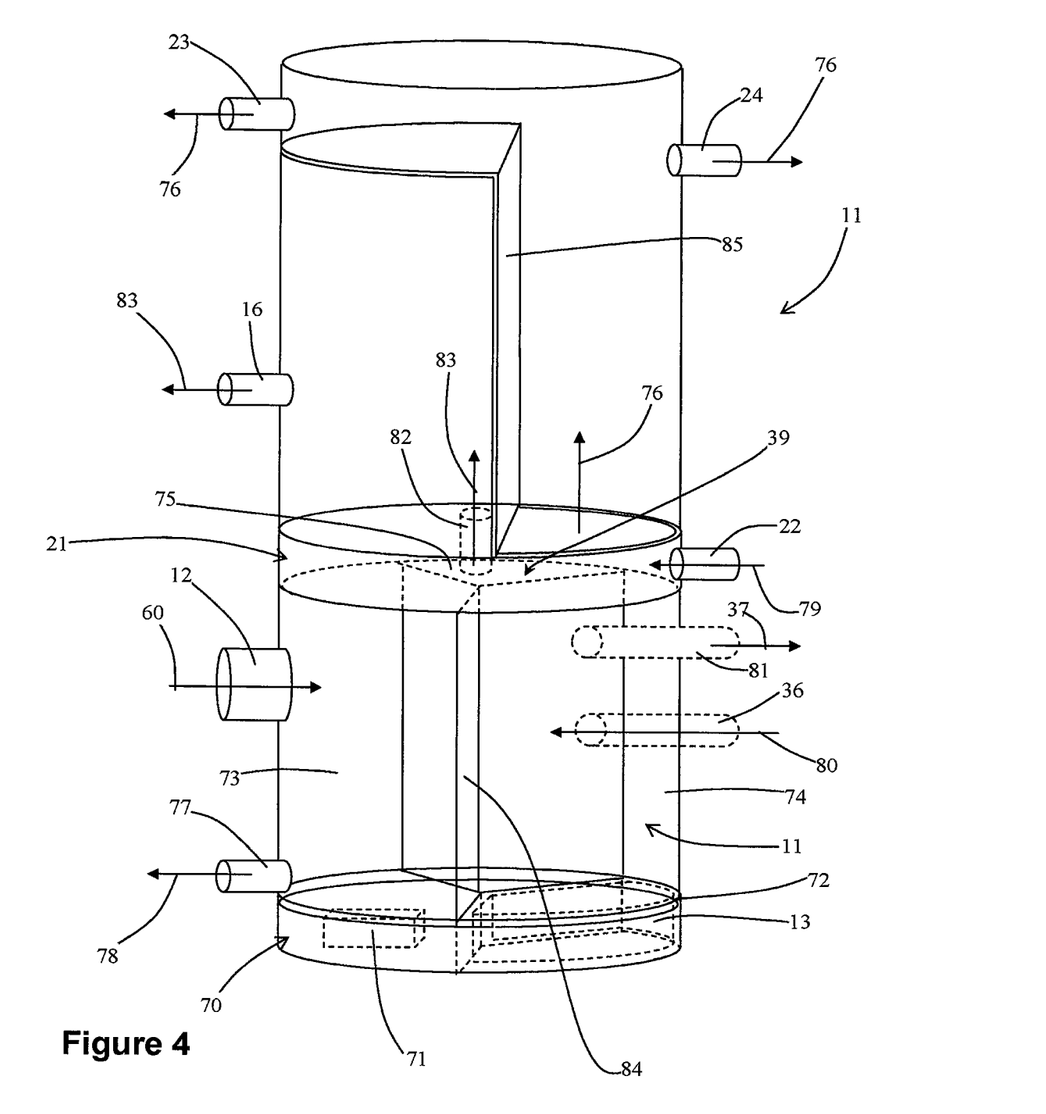

An example of a possible configuration for the heating apparatus 11 is shown in FIG. 4, though it will be appreciated the heating apparatus may be differently configured from this example. In the arrangement of FIG. 4, the heating apparatus 11 has a base 70 on which is rotatably mounted a platform 72. A heater 13 is provided within the base, along with a motor 71 drivingly connected to the platform 72 to effect the intermittent rotation thereof, one third of a revolution at a time, to allow the performance of a batch process.

The platform 72 supports a partition wall 84 which divides the space above the platform into three compartments 73, 74, 75, bound by the outer peripheral wall of the heating apparatus. The partition wall 84 is of a suitable reinforced material capable of withstanding the high temperatures likely to be encountered during operation of the apparatus. The heater 13 is arranged to heat the compartment for the time being thereabove, or primarily thereabove, in the course of rotation of the platform 72.

A boiler 21 is located in the apparatus above the partition wall 84 and includes the water inlet 22. The volume within the apparatus and above the boiler is divided by a further partition wall 85 such that steam 76 generated by the boiler 21 leaves the apparatus through the two steam outlets 23, 24, having the functionality described hereinbefore.

The apparatus includes an inlet 12 for the introduction of coal 60 to the compartment for the time being aligned with that inlet, and an outlet 77 to facilitate the removal of ash 78. The compartment for the time being above the heater allows for the transfer of heat to the boiler, thereby to heat water 79 in the boiler. The apparatus includes an inlet 36 for receiving carbon dioxide from the lime kiln (and which therefore is effectively the outlet 36 of the lime kiln), such that the compartment for the time being aligned with the inlet 36 serves as the coke chamber 39. An outlet 81 for carbon monoxide 37 is provided through the apparatus wall, to communicate with the coke chamber 39. A duct 82 passes through the boiler 21 and communicates with the compartment for the time being therebelow, to transfer to the space above the boiler but separated from the steam, any noxious particulates 83 and other non-desired gases. Those leave the apparatus through outlet 16, to pass to the scrubber 20.

To produce a carbon neutral fuel, coal 60 is heated by gasification, pyrolysis or destructive distillation in an oxygen starved environment in the heating apparatus 11 to produce coke 14 and carbon monoxide 17. Residual excess carbon dioxide 15 is also produced by this process. Water 22 is supplied to the boiler 21 and heat from the heating apparatus 11 is used in the boiler 21 to convert the water into steam.

In a first embodiment which is particularly beneficial for use where the steam is in the region of 900° C. to 1000° C., or greater, a portion of steam from the boiler 21 is directed to the turbine-driven generator set 27 for the generation of electricity and a portion of the steam produced by the boiler 21 is passed to the inner chamber 33 of the limekiln 32 shown in FIG. 3. The electricity produced is transferred to an electrical distribution centre 28.

In a second embodiment which is advantageous where the steam from the boiler is below 900° C., all of the steam is directed to the turbine-driven generator set 27 and some or all of the electricity produced is used to power the resistive heating element 55 of the limekiln shown in FIG. 2.

In a third embodiment, as shown in FIG. 1, steam is passed both to the turbine-driven generator set 27 and also directly to the inner chamber 33 to heat limestone within the limekiln. Some or all of the electricity produced by the turbine-driven generator set 27 is used to power the resistive heating element 55 to further heat the limestone within the limekiln.

In all embodiments, spent steam from the turbine is transferred to the condenser 29 and is condensed into water for further uses, as described in more detail below.

The limekiln 32 is turned to bring the inlet 34 uppermost and in register with the inlet duct 49 so that opening of the gate valves 48, 50 allows the introduction of pre-heated limestone in the cylindrical vessel 45. The valves 48, 50 are closed and the vessel 45 is rotated about the inner chamber 33, so tumbling the limestone in the limekiln 32. The heater within the inner chamber 33 causes heat to be transferred to the limestone as it tumbles around the chamber 33, within the cylindrical vessel 45 of the limekiln 32. The heating of the limestone causes the calcination thereof. Carbon dioxide and waste effluents pass through the outlet 36 of the limekiln to the scrubber 51 to separate the carbon dioxide from the waste effluents. Quicklime produced by the process collects at the lower end 65 of the limekiln 32 and can be released and used to absorb carbon dioxide from the atmosphere.

Coke and carbon dioxide produced by the heating of coal in the heating apparatus 11 is combined in the coke chamber 39 with carbon dioxide produced by the limekiln 32 to form carbon monoxide 37. This carbon monoxide 37 is transferred to the water gas shift reactor 40, along with carbon monoxide 17 produced directly from the heating apparatus 11. Condensed water 52 from the turbine outlet condenser 29 is transferred to the water gas shift reactor 40 and a water gas shift reaction takes place to produce carbon dioxide 41 and hydrogen 42. The hydrogen 42 could be used as a carbon neutral fuel and the carbon dioxide transferred to the lower end 65 of the limekiln 32 to be absorbed by the quicklime.

Carbon dioxide 41 and hydrogen 42 are passed from the water gas shift reactor 40 to the Sabatier reactor 43 and is combined with further hydrogen 18 obtained directly from the heating apparatus 11 to undergo a Sabatier reaction process. This produces methane 66 which can be used as a fuel or which can be processed using known methods 67 to produce methanol, butane or butanol for use as a vehicle fuel 68. Methane 19 produced by the gasification, pyrolysis or destructive distillation of coal in the heating apparatus 11 may also be used directly as a fuel or processed further as discussed above.

The invention claimed is:

1. A system for producing carbon monoxide as a step in a process for the production of carbon neutral fuel, the system comprising:
    heating apparatus arranged to heat coal to produce coke;
    a limekiln comprising: an outer vessel for containing limestone, an inlet for the introduction of limestone into the outer vessel, an inner chamber disposed substantially co-axially within the outer vessel, a heater arranged within the inner chamber for heating limestone contained within the outer vessel, and an outlet for the release of carbon dioxide;
    a coke chamber operatively connected to the heating apparatus to receive coke therefrom and operatively connected to the limekiln outlet to receive carbon dioxide therefrom;
    wherein the coke chamber is configured to react received coke with received carbon dioxide, thereby to produce carbon monoxide.

2. A heating system as claimed in claim 1, further comprising a water gas shift reactor operatively connected to the coke chamber to receive carbon monoxide therefrom and having an inlet for the introduction of water, wherein the water gas shift reactor is configured to react received carbon monoxide with introduced water, thereby to produce hydrogen.

3. A system as claimed in claim 2, further comprising a Sabatier reaction chamber operably connected to the water gas shift reactor to receive carbon dioxide and hydrogen therefrom, wherein the Sabatier reaction chamber is configured to react the carbon dioxide and hydrogen to produce methane.

4. A system as claimed in claim 1, wherein the heating apparatus includes a boiler for converting water to steam, the boiler having an inlet for the introduction of water and an outlet for steam.

5. A system as claimed in claim 4, wherein the heater of the limekiln is in communication with the boiler outlet so that steam from the boiler is supplied to the heater.

6. A system as claimed in claim 4, further comprising a turbine-driven generator set connected to the boiler and means to direct at least a portion of the steam from the boiler to the turbine of the generator set for the production of electricity.

7. A system as claimed in claim 6, wherein the heater of the limekiln comprises an electrical heating element powered by electricity produced by the turbine-driven generator set.

8. A system as claimed in claim 6, comprising a water gas shift reactor operatively connected to the coke chamber to receive carbon monoxide therefrom and having an inlet for the introduction of water, wherein the water gas shift reactor is configured to react received carbon monoxide with introduced water, thereby to produce hydrogen and further comprising a steam condenser in communication with the turbine-driven generator set for the supply of condensed water to the inlet of the water gas shift reactor.

9. A method of producing carbon monoxide as a step in a process for the production of carbon neutral fuel comprising:
heating coal to produce coke;
heating limestone in an outer vessel of a limekiln, the limekiln having an inlet for the introduction of limestone into the outer vessel, an inner chamber disposed substantially co-axially within the outer vessel, a heater arranged within the inner chamber for heating said limestone within the outer vessel, and an outlet for the release of carbon dioxide yielded by the heated limestone;
combining in a coke chamber coke from the heating apparatus with carbon dioxide from the outlet of the limekiln to produce carbon monoxide.

10. A method as claimed in claim 9, further comprising the step of passing the carbon monoxide to a water gas shift reactor, supplying water to the reactor and reacting that water with carbon monoxide using the water gas shift reaction to produce hydrogen.

11. A method as claimed in claim 10 wherein carbon dioxide and hydrogen produced by the water gas shift reaction are reacted using the Sabatier reaction process to produce methane.

12. A method as claimed in any of claimed 9, wherein water is converted to steam in a boiler.

13. A method as claimed in claim 12 wherein steam is passed from the boiler to the heater of the limekiln to heat the limestone within the limekiln.

14. A method as claimed in claim 12, wherein a portion of the steam from the boiler is directed to a turbine of a turbine-driven generator set for the production of electricity.

15. A method as claimed in claim 14, wherein the heater of the limekiln is electrically powered by the turbine-driven generator set.

16. A method as claimed in claim 14, comprising the step of passing the carbon monoxide to a water gas shift reactor, supplying water to the reactor and reacting that water with carbon monoxide using the water gas shift reaction to produce hydrogen and wherein spent steam leaving the turbine is condensed to produce water and the condensed water is supplied to the water gas shift reactor.

17. A method as claimed in claim 9, wherein quicklime produced by the calcination of the limestone is collected from the limekiln and is used to absorb carbon dioxide from the atmosphere.

* * * * *